United States Patent [19]

Cantarutti

[11] 4,068,989

[45] Jan. 17, 1978

[54] TIRE CURING PRESS

[75] Inventor: Armindo Cantarutti, Akron, Ohio

[73] Assignee: NRM Corporation, Akron, Ohio

[21] Appl. No.: 720,192

[22] Filed: Sept. 3, 1976

[51] Int. Cl.² .............................................. B29H 5/02
[52] U.S. Cl. ...................................... 425/38; 425/33; 425/43
[58] Field of Search ........................ 425/38, 31, 32, 43

[56] References Cited

U.S. PATENT DOCUMENTS

| | | | |
|---|---|---|---|
| 3,097,394 | 7/1963 | Mallory et al. | 425/38 |
| 3,222,716 | 12/1965 | Harris | 425/31 |
| 3,343,208 | 9/1967 | Pacciarini et al. | 425/38 |
| 3,471,895 | 10/1969 | Ulm et al. | 425/38 X |
| 3,530,533 | 9/1970 | Turk et al. | 425/32 |
| 3,640,653 | 2/1972 | Laenen et al. | 425/38 X |
| 3,685,929 | 8/1972 | Yoshida et al. | 425/38 |
| 3,846,058 | 11/1974 | Yoshida et al. | 425/38 |
| 3,988,077 | 10/1976 | Naratov et al. | 425/38 X |

*Primary Examiner*—J. Howard Flint, Jr.
*Attorney, Agent, or Firm*—Donnelly, Maky, Renner & Otto

[57] ABSTRACT

A tire curing press which includes a center mechanism projecting from the bottom mold section, such center mechanism including a top movable clamping plate supporting the open upper end of a shaping bladder, and a chuck in the top mold section interfitting between the bead ring on the top mold section and the top plate on the center mechanism, when the press is closed, the chuck including a toe portion adapted to fit under the bead of the cured tire, a conical skirt portion centering the I.D. of the tire bead shortly after the press begins to open, and a heel portion adapted to bear against the bladder as the chuck opens. The cured tire is then under the control of the chuck and is maintained centered as the tire is stripped from the mold sections and the bladder from the tire. The bladder may be stripped from the tire by vertically elongating the bladder with the chuck remaining in contact with the top plate. When the shaping bladder is clear of the tire, the chuck is elevated to lift the cured tire to clear the projecting center mechanism as the press head and top mold section move rearwardly. When fully opened, the chuck extends to place the tire on a tire receiver or take-away conveyor when the chuck collapses. In this manner, the tire is always centered and significant dropping or uncontrolled free movement of the tire is avoided.

40 Claims, 19 Drawing Figures

TIRE CURING PRESS

This invention relates as indicated to a tire curing press and more particularly to a tire curing press of the type having a shaping or center mechanism projecting from the bottom mold section of the press. More particularly, the invention relates to a press of simplified structure avoiding the requirement of complex unloading and stripping mechanisms and achieving better control of the tire as it is stripped from the top and bottom mold sections, from the shaping bladder, and transported to post-cure operations.

In order to strip a cured tire from top and bottom mold sections, as well as the shaping bladder of a center mechanism, considerable pulling, shoving, and tugging on the tire is required. When the tire is subjected to such forces, it has long been recognized that the tire should be held against such forces and in such a manner that if such forces are suddenly released, the tire will not pop out of its desired position.

An early unsuccessful attempt to restrain the tire during stripping is seen in U.S. Pat. No. 3,260,782. In such patent, a plurality of sector segment plates capable of being expanded to a diameter exceeding the diameter of the circular tire beads was placed between the upper and lower beads of the tire interiorly of the shaping bladder. This type of tire stripping employing sector segment plates has the disadvantage that the stripping is adversely affected by deterioration of the rubber at the inside of the bladder producing a very unstable stripping. This coupled with the tendency of the material of the segment plates to early deterioration due to exposure to the curing fluid within the bladder caused a reduced service life, with the result that maintenance and control of the segment plates were extremely troublesome.

A subsequent attempt to avoid the problems created by the chuck within the bladder is found in U.S. Pat. No. 3,714,321 and U.S. Pat. No. 3,846,058. In such patents, there is disclosed a similar chuck mounted on the top of the clamping ring of the upper clamping device for the shaping bladder. When the chuck is opened, the segment plates simply move horizontally and hopefully beneath the upper bead of the cured tire. The chucks of the aforementioned patents do not ensure that the tire after stripping remains precisely centered, since the chuck is simply horizontal plates.

Moreover, both types of chucks simply leave the tire hanging on the bladder or center mechanism after stripping from the molds and the bladder from the tire. Accordingly, an unloading mechanism which will lift the tire over the center mechanism and transport the same to the rear of the press to a post curing operation is still required. Such mechanisms can be complex and expensive as seen, for example, in co-pending application Ser. No. 536,252 in the name of Dale S. Barton, et al, Filed Dec. 24, 1974 entitled "Tire Press Unloader", now U.S. Pat. No. 4,013,186.

Such unloading mechanisms are usually in the form of a platform inserted beneath the tire and then elevated to lift the tire over the projecting center mechanism. However, if the tire is not properly centered, a bead may get caught beneath the upper bladder clamping plate pinching or twisting the bead end resulting in a tire defect known as a "kinked" bead.

In tire presses which do not incorporate an open-ended shaping bladder, but rather which may employ a fully molded shaping bladder which may be invaginated into a well in the bottom mold section or supported by a post, plate-type chucks have been employed to lock the upper bead of the tire to the top bead ring. In this manner, the tire may be transported with the upper mold section as the same moves upwardly and then rearwardly. However, the top bead ring of the mold is usually vertically movable to strip the tire from the upper mold section and stripping bars are employed to engage the tire, usually at one edge only, to ensure that the tire is stripped from the top bead ring as the latter is retracted. When thus released, the tire drops onto an inclined take-away conveyor. The use of such stripping bars may cause the tire to cock as it drops onto the take-away conveyor requiring the tire to be caught and recentered before it moves into the post cure inflator. An example of chucks used with the aforedescribed fully molded bladders may be seen in Mallory et al U.S. Pat. No. 3,097,394, and Ulm et al U.S. Pat. No. 3,584,335.

SUMMARY OF THE INVENTION

In accordance with the present invention, there is provided a tire curing press of either the slideback or tilt-back type which includes a center mechanism projecting from the bottom mold section, such center mechanism including top and bottom movable plates supporting an open-ended shaping bladder therebetween. The chuck is mounted in the top mold section closely interfitting between the bead ring of the top mold section and the top plate of the center mechanism, such chuck including segments having a relatively thin flaring conical skirt portion fitting between the similar surfaces of the bead ring of the top mold section and the top plate of the center mechanism, and an arcuate dull-knife edge toe projecting horizontally from the lower edge of the skirt portion adapted, as the press opens and the chuck opens, to move between the bladder and the top bead of the cured tire with the skirt portion centering the I.D. of the tire bead. The underside of the dull-knife edge of the chuck segment is formed into a heel bridging the gap between the plate and bead ring with a relatively smooth surface and bearing against and forcing the bladder away from the upper tire bead as the chuck opens.

In this manner, the cured tire is secured and held centered as it is stripped from the top mold section, from the bottom mold section, and as the bladder is stripped from the tire. The chuck remains in contact with the top plate during such stripping. When the shaping bladder is clear of the tire, the chuck is elevated into the top mold section to lift the cured tire to clear the projecting center mechanism as the press head and top mold section moves upwardly and rearwardly. When fully opened, the chuck may axially extend to place the tire on a tire receiver or take-away conveyor when the chuck collapses. In this manner, significant dropping or uncontrolled free movement of the tire is avoided.

In a tilt-back press, the receiver may be provided with a peripheral tire support to prevent the tire from being caught on the toe of the chuck when collapsed. When the chuck is retracted, the chuck nests in the top bead ring and when the press closes on an uncured tire, the top plate of the center mechanism nests within the chuck and is centered thereby.

With the present invention, complex unloading and stripping mechanisms are avoided and better control of the tire from cure to post-cure cooling is obtained.

Accordingly, a primary object of the present invention is to provide a tire curing press of the type having a projecting open-ended shaping bladder center mechanism which does not require complex unloading and stripping mechanisms.

Another principal object is the provision of such press which provides better control of the tire as it moves from cure to post cure cooling.

Another important object is the provision of a tire press which includes a stationary and movable mold section with a bladder center mechanism in the stationary mold section having a movable top plate, and a chuck in the movable mold section cooperating with the top plate operative to center the top bead of the tire shortly after the press begins to open, first to secure the tire while the tire is stripped from the mold sections and the bladder is stripped from the tire, and then to remove the cured tire from the press with the movable mold section.

Still another important object is the provision of a chuck for the purposes described which will keep the tire centered throughout the stripping and removal operation.

Still another object is the provision of a chuck of the type described which can be moved vertically either independently or by the top plate of the center mechanism.

A further object is the provision of such chuck which includes segments having relatively thin flaring skirt portions fitting between the top bead ring and the top clamping plate of the center mechanism with an arcuate dull-knife edge toe projecting horizontally from the lower edge of the skirt portion adapted, as the press opens and the chuck opens, to move between the bladder and the top bead of the cured tire with the skirt portion centering the I.D. of the tire bead.

A still further object is the provision of such chuck in which the underside of the dull-knife edge of the chuck segment is formed into a heel which bridges the gap between the plate and bead ring with a relatively smooth surface and which bears against and forces the bladder away from the upper tire bead as the chuck opens.

Another object is the provision of a tire press wherein the cured tire is at all times secured or controlled during the stripping and unloading operation.

Yet another object is to provide a tire curing press which may utilize a variety of stripping procedures, some of which simplify the process and require a less complex center mechanism.

Also, an object is to provide a less complex tire curing press having more reliable performance and long service life with attendant ease of maintenance and overhaul.

Other objects and advantages of the present invention will become apparent as the following description proceeds.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DESCRIPTION OF THE PREFERRED EMBODIMENT

Figure 1:
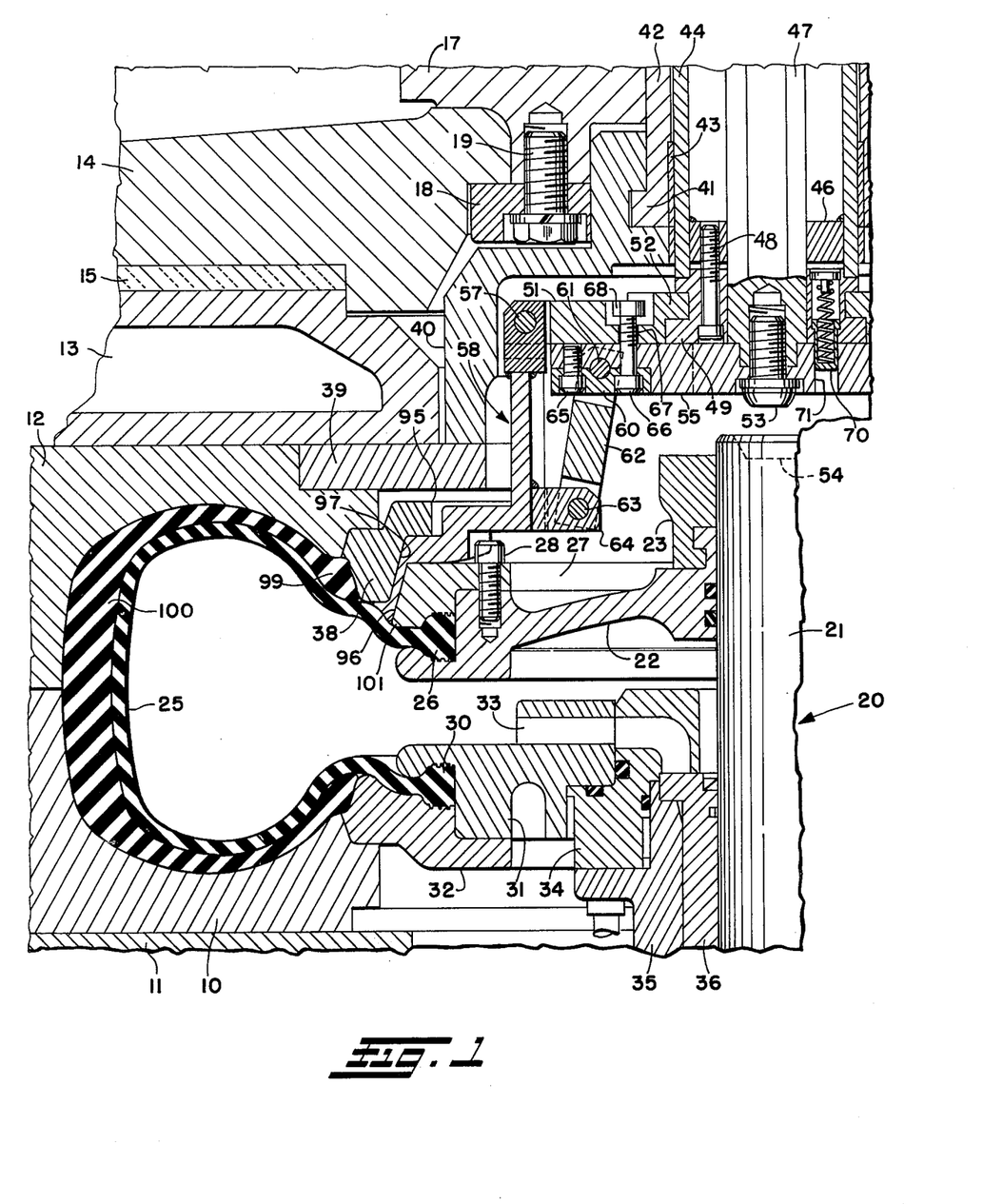
FIG. 1 is a fragmentary vertical section showing the press closed with the chuck collapsed and nested between the top bead ring and the upper clamping assembly of the bladder or center mechanism.
Figure 2:
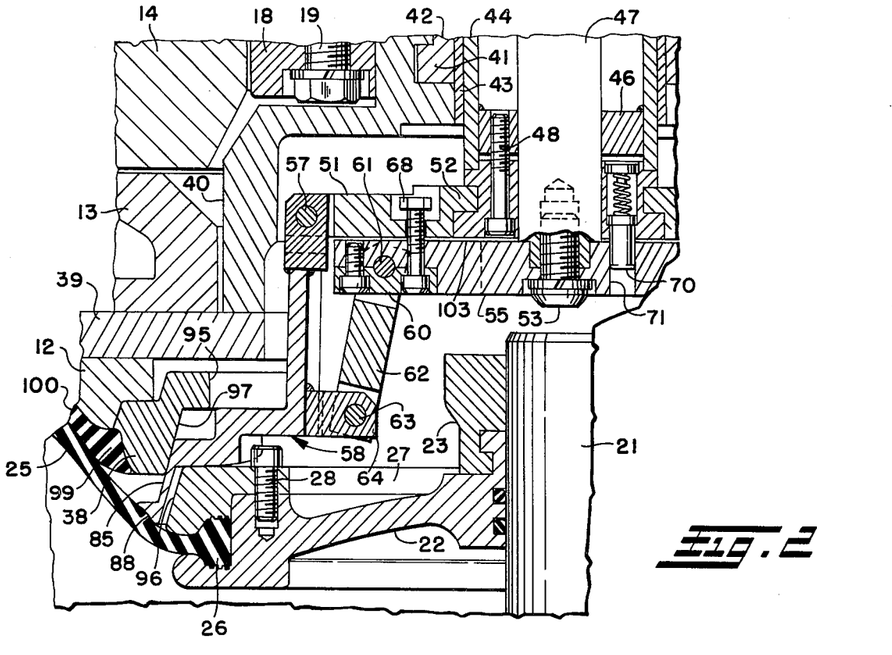
FIG. 2 is a view similar to FIG. 1 showing the press slightly opened and the chuck beginning to open.
Figure 3:
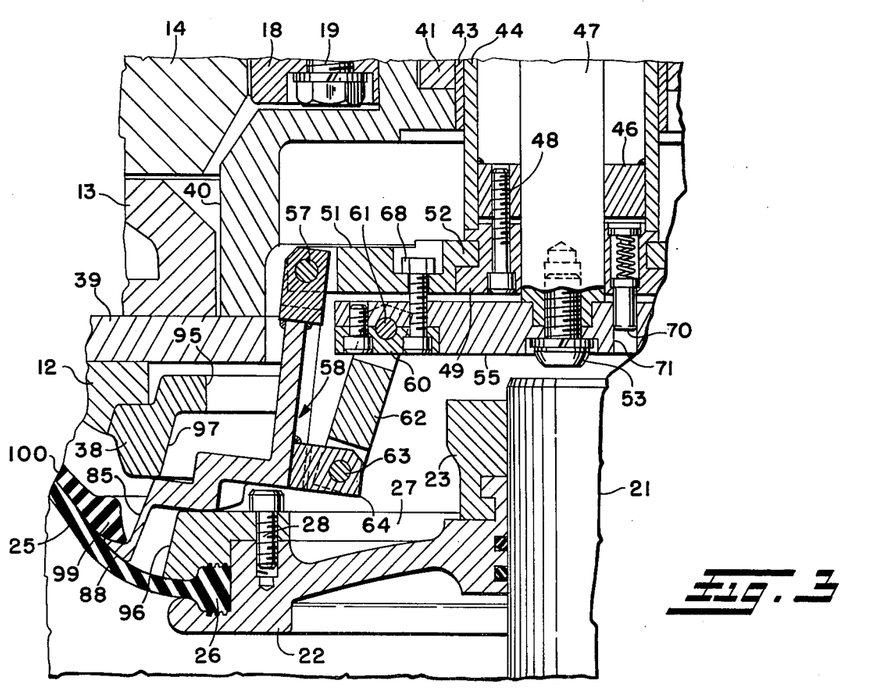
FIG. 3 is a view similar to FIGS. 1 and 2 showing the press further slightly opened and the chuck fully opened.

Referring now to FIGS. 1, 2 and 3, and more particularly to FIG. 1, there is illustrated a tire press in accordance with the present invention. In FIG. 1, the press is illustrated in its closed and curing condition, while in FIGS. 2 and 3, the press has opened slightly and progressively.

The press comprises in generally conventional fashion a bottom mold section 10 supported on platen 11 in turn secured to the press base. A mating top mold section 12 is supported from platen 13. Both the upper and lower platens are hollow for the circulation of the heating or curing medium therethrough. The upper platen is supported from bolster 14 and separated therefrom by a layer of insulation 15. The bolster is in turn supported from an adjusting nut 17 by retaining ring 18 secured by fasteners 19, such nut including an axial extension threadedly supported in the beam or press head for vertical adjustment. The beam or press head supporting the top mold section moves vertically away from the base of the press supporting the bottom mold section and then rearwardly and vice-versa to open and close the press. This is usually accomplished in conventional manner by bull gears and links connected to the beam, such beam moving in slots in side plates.

The press also includes a center or shaping mechanism shown generally at 20 which includes a center post 21 to which is secured and sealed a top bladder plate 22 by clamp 23. An open-ended or unstanding shaping bladder or bag 25 is provided with an upper bead 26 which is clamped to the top plate by clamping ring 27 held in place by fasteners 28.

The lower bead 30 of the bladder is clamped to bottom plate 31 by clamp ring 32, which is also the bottom bead ring of the mold. Curing medium is introduced into the bladder through a series of passageways in the bottom clamp plate as indicated at 33 and also in distribution block 34, both of which are secured to each other and to vertically movable post cylinder 35. The post 21 is supported in gland 36 which is in turn supported by the post cylinder 35. The lower end of the post is provided with a piston, not shown, so that the post is vertically movable within the post cylinder. The post cylinder is in turn supported for vertical movement by actuating cylinders, seen, for example, in FIG. 17.

Unlike the bottom bead ring 32 which is mounted on and movable with the bottom plate 31 of the center mechanism, the top bead ring 38 is secured to the top mold section 12. Also secured to and between the top mold section 12 and the platen 13 is the annular base plate 39 of bell shape housing 40. Such housing may be formed in two halves clamped together at its upper end about the lower flanged end 41 of vertically extending cylinder 42. The lower end of the cylinder 42 and the I.D. of the housing 40 are provided with a bushing 43 in which is mounted vertically movable cylinder 44. Secured to the interior of the cylinder slightly above the lower end thereof is a ring 46 which has a hexagonal interior opening accommodating hexagonal rod 47. A plurality of elongated fasteners 48 secure chuck connector 49 to the lower end of cylinder 44. Such chuck connector also has a hexagonal center hole accommodating the hexagonal rod 47. The chuck connector is connected to chuck spider 51 through a breech or bayonet lock shown at 52.

Secured to the lower end of the hexagonal rod 47 by fastener 53 is a chuck operator spider 55. The top of the post may be recessed as indicated at 54 to clear the fastener 53, if desired.

Each arm of the spider 51 is provided with a clevis by means of which a spider arm is connected by pins 57 to the upper end of chuck segments 58.

Each arm of the operator spider 55 is provided with a clamp 60 securing pins 61 thereto, by means of which links 62 are pivotally connected to the operator spider 55. Each end of the link 62 is clevised and the lower end is connected by pin 63 to projection 64 extending rearwardly of the segment 58.

Each pin clamp 60 is held in place by two fasteners 65 and 66. The former is somewhat shorter than the latter and is threaded only in the chuck operator spider 55. The latter is somewhat longer and is threaded in the chuck operator and extends through a clearance hole 67 in the spider 51. The top of the fastener is provided with a stop nut 68 which may be wire or pin locked against rotation. The position of the stop nut 68 on the shank of the fastener 66 limits the relative vertical movement between the spider 51 and the chuck operator spider 55.

For assembly and locking purposes, the chuck connector 49 is provided with a spring detent 70 which snaps into hole 71 in the chuck operator 55. Without the detect being retracted, the bayonet lock 52 cannot be opened.

Both the chuck operator spider 55 and the spider 51 are provided with eight arms, in the illustrated embodiment, and there are then, of course, eight chuck segments 58 and eight operating links 62. Both the cylinder 44 and the hexagonal rod 47 are operated by independent pneumatic piston-cylinder assemblies on the press head. When the two spiders are adjacent each other as seen in FIG. 1, the chuck segments are fully retracted. When the operator spider 55 has moved downwardly with respect to the spider 51 to the extent permitted by the stop nuts 68, the chuck will be fully opened. The fully retracted and fully opened positions of the chuck may be seen in comparing FIGS. 1 and 3, respectively.

Figures 4, 5, 6, 7:
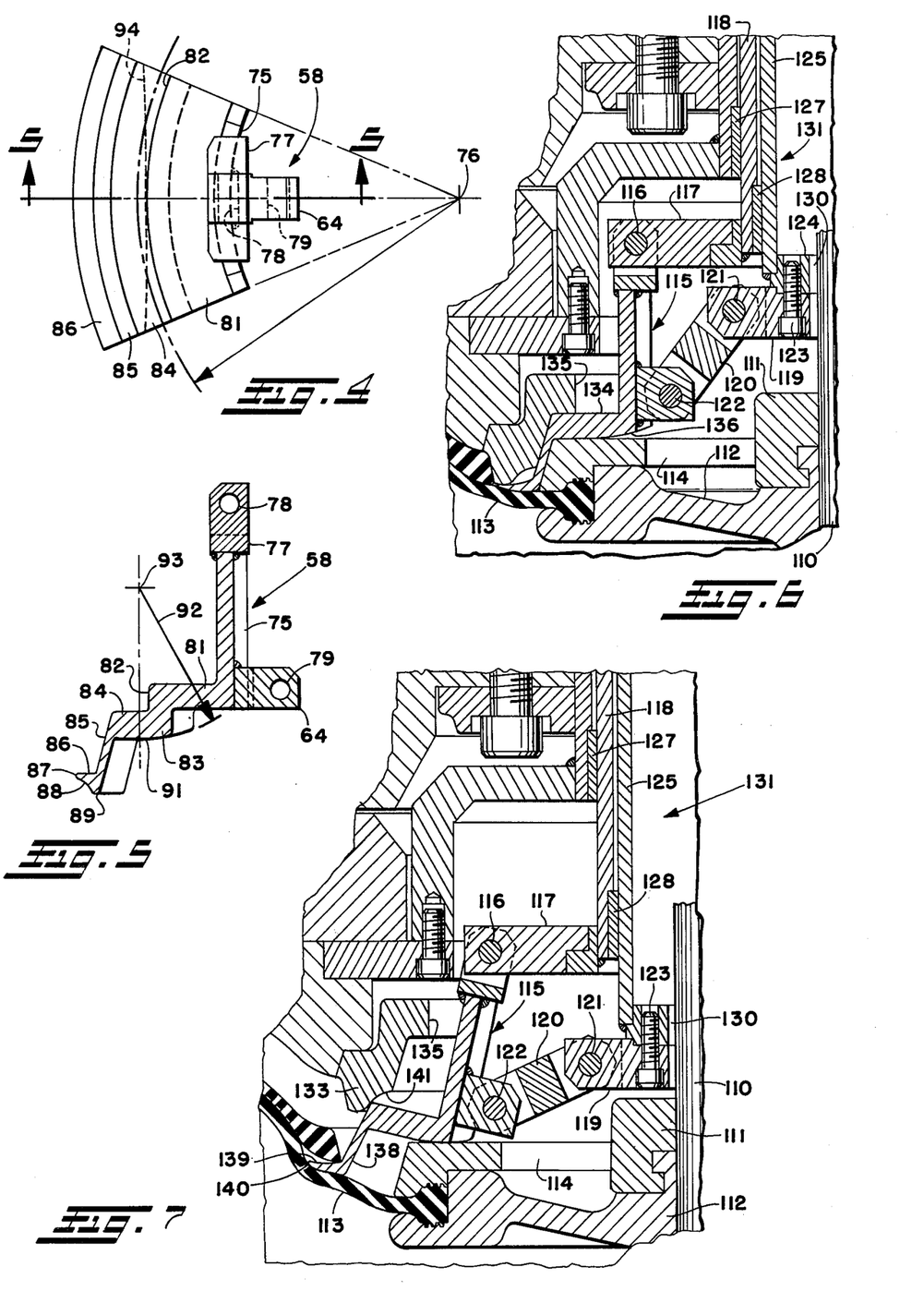
FIG. 4 is a top plan view of one of the segments of the chuck.
FIG. 5 is a vertical section through one of such segments as taken substantially on the line 5—5 of FIG. 4.
FIG. 6 is a view similar to FIG. 2 illustrating a slightly modified chuck.
FIG. 7 is a view similar to FIG. 6 illustrating the chuck of FIG. 6 fully opened and securing the tire.

Referring now additionally to FIGS. 4 and 5, it will be seen that each chuck segment 58 includes a vertical cylindrical portion 75, the cylindrical extent of which is no more that 45° from the center 76, which is the center of the tire cavity. It should be noted that when the chuck is closed, the segments form a complete circle, and even when opened, a substantially complete circle since the gap between the segments will be slight. At the top of such vertical portion, there is secured inverted T-shape member 77, the projecting stem of which is provided with the hole 78 for the pin 57. The projection 64 extends rearwardly from the bottom center of the vertical portion 75 and is provided with the hole 79 for pin 63.

Projecting forwardly from the lower end of the vertical portion 75 is a first horizontal portion 81 which terminates in a circular shoulder 82. The segment then extends downwardly as indicated at 83 and again horizontally as seen at 84. From the lower horizontal portion 84, a relatively thin conical skirt 85 of uniform thickness extends downwardly and outwardly. The forward edge of the flaring conical skirt terminates in a horizontal shelf 86, which itself terminates in a radiused dull-knife edge 87. The underside of the shelf projects downwardly and rearwardly in a radiused surface 88 to a radiused heel 89 at the lower edge of the inside of the skirt 85. As an example of the relative radiuses involved, the edge 87 may be at a radius of approximately 1.6 millimeters, the surface 88 at a radius of approximately 11 millimeters, and the heel 89 at a radius of approximately 3 millimeters.

The underside 91 of the projection 84 is provided with a relatively long radius as indicated by the arrow 92 struck from the center 93. The purpose of the relatively long radius on the surface 91 is to maintain full line contact between the underside of the segment and the top annular planar surface of the clamp ring 27 securing the bladder to the top plate 22. Such line contact is seen, for example, by the the dotted line 94 in FIG. 4, and such line contact will be maintained where the chuck is opened or closed.

Comparing now FIGS. 1 and 5, it will be seen that the step between the shoulder 82 and the lower horizontal portion 84 provides a clearance for the horizontal top flange 95 of the bead ring 38. The top clamping ring 27 for the top plate 22 of the bladder includes a flaring conical pilot surface 96 which normaly would fit in and nest against the conical or pilot surface 97 of the bead ring 38. This, of course, maintains the post and bladder concentric with the mold and tire during cure. Both the inside and the outside of the flaring skirt 85 of the chuck have the same conical angle as the normally nesting surfaces 96 and 97 so that when the chuck is retracted as seen in FIG. 1, the chuck forms a positive stop for the top bladder plate and also centers the top bladder plate and post with respect to the bead ring 38 and thus the mold sections.

Also, it should be noted that in the closed position of the mold and with the chuck segments nested between the pilot surfaces of the bead ring 38 and the clamp ring 27, a positive vertical stop is provided between the top surface of the clamp ring 27 and the flange 95 of the bead ring. The curved lower surface of the heel of the chuck as seen at 88 forms a smooth contour between the underside of the bead ring adjacent the bead 99 of the tire 100 and the edge 101 of the clamp ring 27. Thus the bladder 25 is not subjected to significant distortions when under pressure during shaping and cure.

Referring now to FIGS. 2 and 3, in FIG. 2, the press has opened approximately 12 millimeters and with pressure on the cylinder actuating the rod 47, the chuck operator spider 55 has moved downwardly a very small amount providing a very slight clearance between the spider 51 and the spider 55 as indicated at 103. This, of course, moves the links 62 downwardly pivoting the chuck segments 58 in a counterclockwise direction, as seen in FIGS. 1, 2 and 3, about the pins 57. In the initial opening of the press, such pivoting of the chuck segments is limited by the contact between the exterior of the skirt 85 of the chuck and the pilot surface 97 of the bead ring 38. Also, at the same time, pressure is exerted on the cylinder 44 to hold the entire chuck assembly against the top surface of the clamp ring 27 even as the chuck segments begin to pivot outwardly about the pins 57 maintaining the line contact as exemplified by 94 in FIG. 4. In such position, the heel of the chuck segments formed by the radius 88 between the radii 87 and 89 maintains contact with the bladder as indicated in FIG. 2 to assist in separating the bladder from the top bead 99 of the tire.

Referring now to FIG. 3, the press has opened, for example, approximately 30 millimeters and the pressure on cylinder 44 maintains the line contact between the underside of the chuck and the top surface of the clamping ring 27. The pressure on the rod 47 has moved the operator spider 55 downwardly and the top edge of the skirt 85 has cleared the underside of the bead ring 38. This permits the chuck segments to move outwardly to the full extent permitted by the stop nuts 68 and in such position, the heel 88 of the segments continues to exert a pressure on the bladder. The dull-knife edge 87 has moved beneath the bead 99 of the tire with the shelf 86 now underneath the bead of the tire. In the fully opened position of the chuck as seen in FIG. 3, the chuck nonetheless remains in contact with the clamping plate 27 of the center mechanism and the chuck segments have now moved to their fully opened position as dictated by the position of the stop nuts. In such position, the chuck segments are concentric with the bead of the tire within a tolerance of, for example, 0.8 millimeters. Although it is preferred that the chuck segments move to a positive stop, it will be appreciated that a slight pressure on the I.D. of the tire bead may be obtained and, in any event, the top bead of the tire will be held concentrically by the chuck and such concentricity of the tire will then be maintained with the center mechanism.

In view of the pressure of contact between the chuck segments and both the bead ring 38 and the clamp ring 27 of the bladder or center mechanism, it is desirable, to avoid galling, that the chuck segments, as well as the pins 57, 61 and 63, be case hardened and/or coated with a dry film lubricant such as molybdenum disulfide.

THE EMBODIMENT OF FIGS. 6 AND 7

Referring now to FIGS. 6 and 7, there is illustrated a tire stripping and unloading chuck in accordance with the present invention which is modified slightly from the preferred embodiment of FIGS. 1, 2 and 3.

The post 110 of the center mechanism may extend substantially vertically beyond the clamp 111 for the top plate 112 supporting the bladder 113 in association with the clamp ring 114. The chuck segments 115, generally similar to the chuck segments 58, are pin connected at 116 to spider 117 which is in turn connected to vertically movable cylinder 118. The cylinder 118 is vertically movable by a pneumatic piston cylinder assembly in the head of the press in the same manner as the cylinder 44 in the FIG. 1 embodiment.

The chuck operator spider 119, connected by links 120 to the segments 115 through the pin connections shown at 121 and 122 is secured through fasteners 123 to annular ring 124 secured to the bottom of cylinder 125. The upper end of the cylinder 125 is connected to the rod of another pneumatic piston cylinder assembly in the head of the press to operate the cylinder 125 with respect to the cylinder 118. Both cylinders 118 and 125 are mounted at their lower ends in guide bushings 127 and 128, respectively. Both the operator spider 119 and the ring 124 to which it is connected are provided with aligned center holes indicated at 130 through which the post 110 projects into the opening 131 provided by the cylinder 125. In this manner, the chuck may be operated without interfering with the projecting post.

In FIG. 6, the chuck segments 115 are shown fully closed and nested between the clamping ring 114 and the bead ring 133. The segments are provided with the horizontal step 134 fitting between the bead ring flange 135 and the clamping ring 114. The underside of such step is radiused as indicated at 136 to maintain the noted line contact with the top flat surface of the clamping ring 114. If the clamping ring is held to the plate 112 by recessed fasteners, the second step of the chuck segment need not be provided.

The chuck segment is provided with the conical skirt 138 of uniform thickness fitting and nesting between the conical pilot surfaces of the bead ring and clamping ring. The foot of the skirt 138 may be of slightly different configuration than the segment shown in FIG. 1. The shelf or top surface of the foot 139 is provided with a relatively long radius from the skirt to the dull-knife edge 140 so that when the chuck is fully extended as seen in FIG. 7, the top shelf is generally horizontal. The underside of the foot is somewhat more flat than the foot of the segment of FIG. 1 and, in the closed position of the press, bridges from the underside of the bead ring adjacent the tire bead to the clamp ring adjacent the bladder. The bead ring may be undercut as indicated at 141. When the press is closed and during the cure, the foot of the chuck segment will bridge across such undercut.

As the press opens as indicated in FIG. 7, the chuck operator 119 moves downwardly, preferably to a fixed stop, which may be provided, for example, by a pin and slot connection between the two cylinders 118 and 125. In such position, the foot of the segment presses against the bladder and the dull-knife edge moves beneath the bead 142 of the tire. FIG. 7 would correspond to FIG. 3 with the chuck fully opened and securing the tire. In such position, the chuck remains in contact with the clamping ring of the center mechanism top plate. The tire is now secured by the chuck and the press is ready to commence the stripping and unloading operations now to be described.

OPERATION

Several operational sequences of the press from the cure condition to the final unloading step are seen in comparing sequentially FIGS. 1, 2, 3 and some of FIGS. 8 through 16. In FIG. 1, the chuck is, of course, closed and in its nested position between the clamp ring 27 of the top plate of the center mechanism and the bead ring 38. In FIG. 2, the press has opened slightly and the chuck begins to expand. Pressure on both the cylinder 44 and rod 47 maintain the chuck in contact with the top clamp plate 27 even as the chuck completes its expansion as seen in FIG. 3 to the extent permitted by the stops. In FIG. 3, the tire is engaged by the chuck and is held in concentricity for the subsequent stripping and unloading operations. By the time the press has achieved the elevation seen in FIG. 3, the tire is stripped from the top bead ring 38 and the top mold section.

Referring now to schematic FIGS. 8 through 16, there is shown sequentially a somewhat different operation of the press from the cure to the final unloading step.

Figure 8:
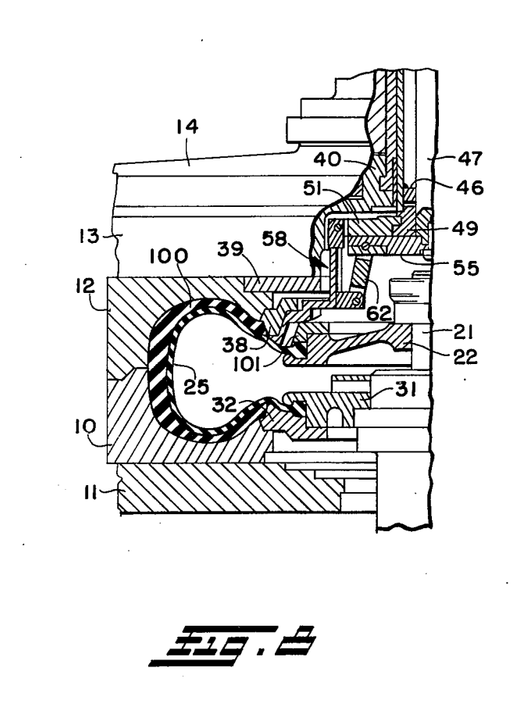
FIGS. 8 through 16 are sequential schematic illustrations showing one sequence of operations of the invention.

Referring first to FIG. 8, the press is shown closed and is in the same general position as seen in FIG. 1. In such position, the top clamping ring 27 of the top plate 22 of the center mechanism is nested in the interior of the skirt of the fully retracted chuck, such chuck in turn being nested in the pilot and stop surfaces of the top bead ring 38. This maintains the center mechanism and thus the bladder centered with respect to the mold sections. In such position, the chuck is nested between the center mechanism and the top bead ring and its foot forms a relatively smooth continuation between the two.

Figure 9:
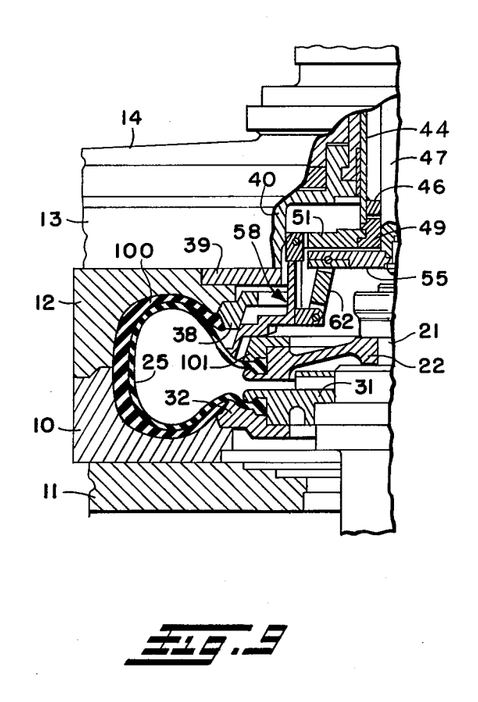

Referring now to FIG. 9, at the completion of the cure cycle, while the press remains closed, the top clamping ring assembly of the center mechanism is lowered slightly while at the same time the chuck is extended by downward pressure on the cylinder 44 which holds the chuck against the top bladder clamping ring 27. Simultaneously, pressure is exerted on the rod 47 pushing the chuck operator down which tends to open the chuck. As the chuck begins to open and, of course, moves down with the top clamping assembly of the center mechanism, the heel of the segments press against the bladder assuring that the bladder is stripped from the underside of the top bead of the tire. In this manner, the chuck acts as an enlargeable extension of the top bladder clamping ring preventing stretching or distortion of the bladder and assuring that it is stripped from the upper bead of the tire.

When curing smaller size tires or because of clearance problems, it sometimes may not be possible to move the top clamping ring assembly downwardly before opening the press. In such case, the chuck would act as seen in FIGS. 2 and 3.

Figure 10:
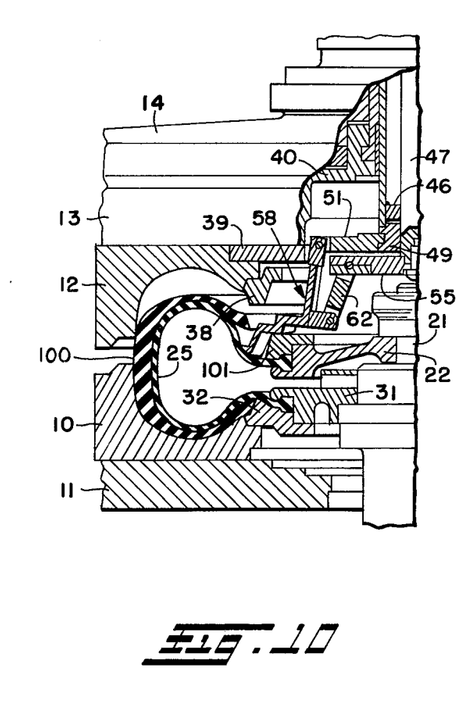

In FIG. 10, the press begins to open and the chuck is still held against the retracted top bladder clamping ring assembly. When the top bead ring has cleared the outside of the skirt of the chuck segments, the chuck fully expands to the extent permitted by the stops, and the shelf of the segments move beneath the top bead of the tire.

Figure 11:
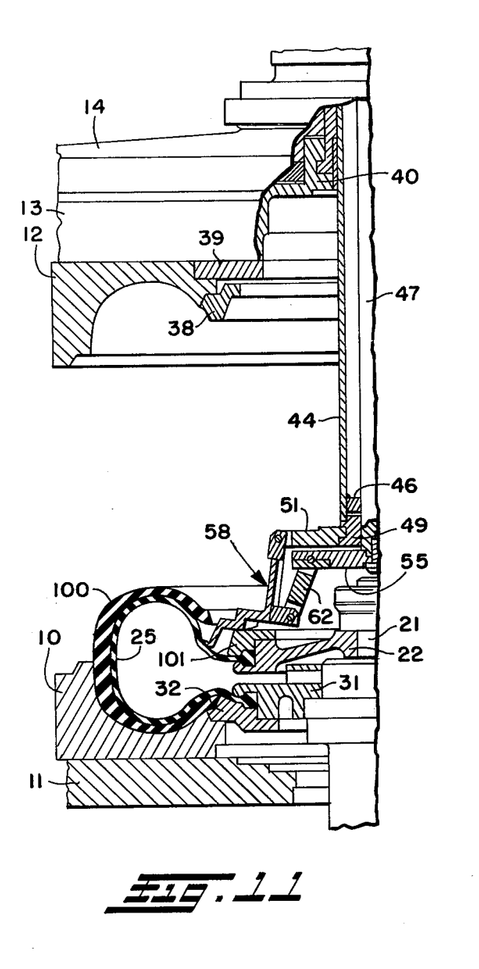

Referring now to FIG. 11, the press continues to open to the intermediate position shown and stops. In such condition, the top mold half has been stripped from the tire, but the chuck is still held against the top bladder clamping ring assembly and is fully expanded pressing the bladder away from the interior of the top bead of the tire.

Figure 12:
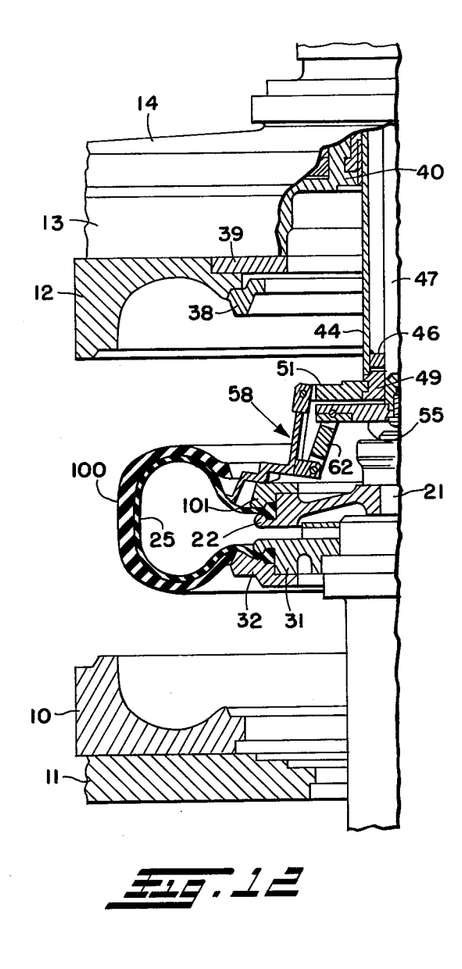
Figure 13:
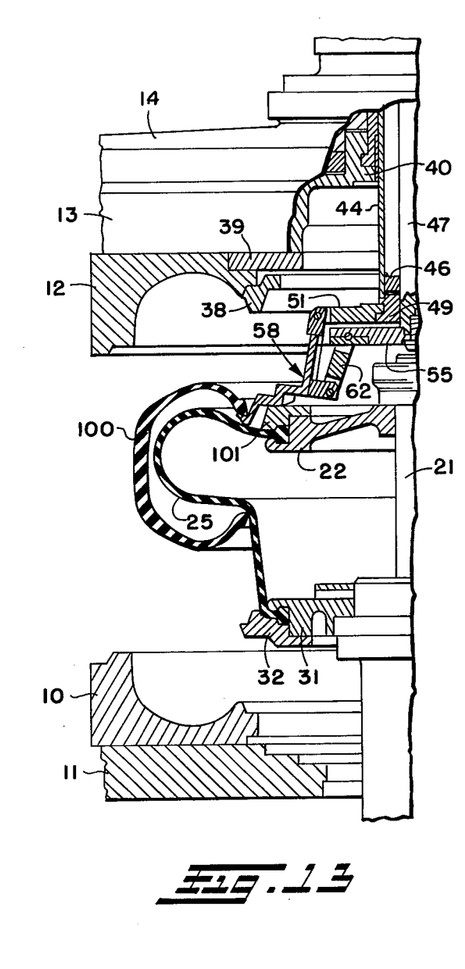

In FIG. 12, the press is still stopped in the intermediate open position shown and the entire center mechanism now moves upwardly. Low pressure is maintained on the cylinder 44 and the rod 47 maintaining the chuck against the top bladder clamping ring assembly fully expanded. The movement of the center mechanism is sufficient to overcome such low pressure in the chuck operating piston-cylinder assemblies. The movement of the center mechanism to the substantially centered position indicated strips the tire from the lower mold half. Referring now to FIG. 13, the press head is still stopped in the intermediate open position shown. Simultaneously, the top bladder clamping ring assembly is moved upwardly, while the lower bladder clamping assembly moves downwardly to strip the bladder from the tire. Again, the chuck is held against the top bladder clamping ring assembly fully expanded moving upwardly therewith. In such position, the tire now engages the horizontal shelf of the chuck segments and is maintained on such shelf and is centered with respect to the center mechanism as the bladder is stripped therefrom.

Figure 14:
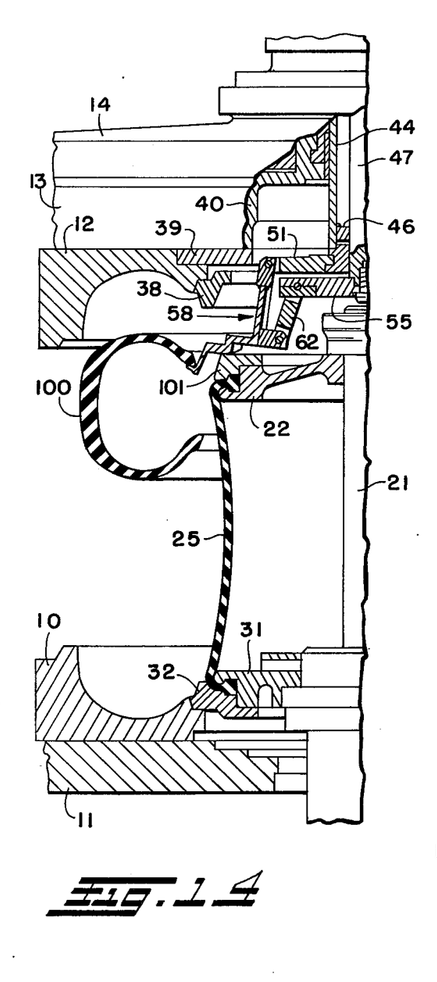

In FIG. 14, the press head is maintained in its stopped position and the bladder is out of the tire and fully extended and under slight vacuum. The chuck is still held against the top bladder clamping ring assembly fully expanded engaging the tire and centering the same with respect to the bladder mechanism.

At this point, is should be noted that the operational steps shown in FIGS. 12 and 13 may be omitted. The elevation of the center mechanism in FIG. 12 strips the tire from the bottom mold and the separation of the clamping assemblies seen in FIG. 13 strips the bladder from the tire. However, with the chuck expanded as in FIG. 11, the elevation of the post under sufficient pressure pushing the chuck up will both strip the tire from the lower mold half and strip the bladder from the tire. Thus, the bottom clamping assembly of the bladder need not move.

Figure 15:
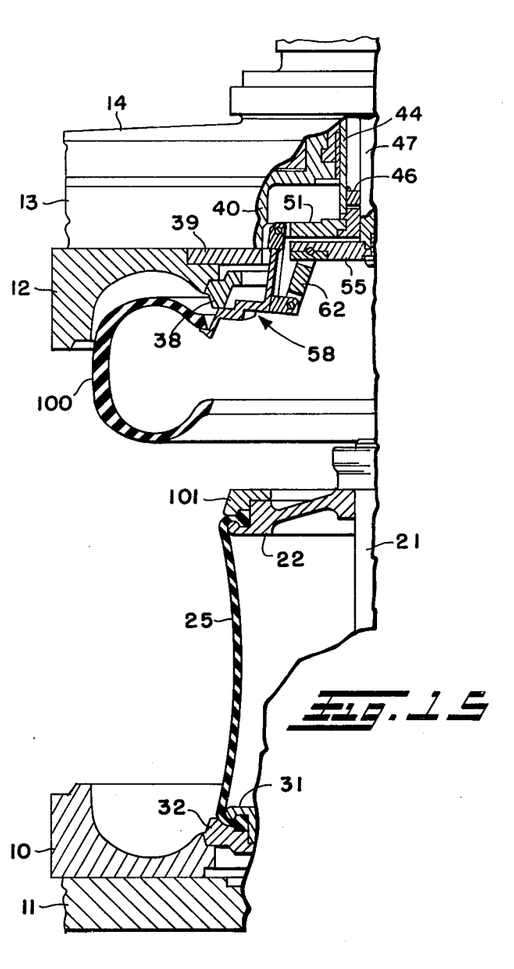
Figure 16:
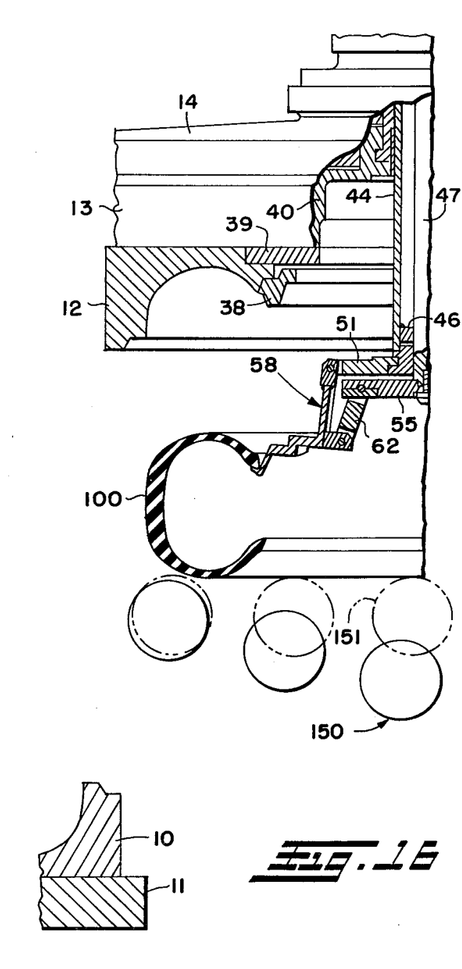

As seen in FIG. 15, the press head now continues to open and the chuck cylinder 44 is retracted. The chuck, however, remains fully expanded. In such position, the chuck segments engage the underside of the top bead ring and can retract no further. The press as indicated opens to its complete vertical position and now begins to move horizontally rearwardly to offset the upper mold section from the lower mold section as indicated in FIG. 16. In the preferred embodiment, the mold sections are maintained in parallelism as the press head and upper mold section move rearwardly. Such a press is known as a slideback press and has been sold in great numbers in this country and throughout the world by NRM Corporation of Akron, Ohio. Such slideback type of press may be seen, for example, in the aforementioned U.S. Patent to Mallory et al, U.S. Pat. No. 3,097,394. In such fully opened position of the press, the lower mold section is cleared for overhead loading of the green tire and the cured tire is now over unloading conveyor 150 seen in FIG. 16. Such unloading conveyor may, for example, be mounted for tilting movement from a horizontal position seen at 151 to the inclined position shown. When the press is fully opened, the chuck now extends vertically downwardly to deposit the cured tire on the unloading conveyor. As soon as the tire is deposited on the unloading conveyor, the chuck operator retracts to contract the chuck to release the tire and the entire chuck assembly now vertically retracts into the top mold section nesting in its closed position in the top bead ring. The chuck may actually contract after the tire has engaged the unloading conveyor and when the chuck has vertically cleared the tire, the conveyor may tilt to the position shown to deposit the tire by gravity into a post cure inflator.

While the cured tire is being unloaded in the manner shown in FIG. 16, a green tire is being positioned on the bottom mold section over the upstanding center mechanism. When the chuck is fully retracted and in position in the top mold section, the press is now ready to close to commence the shaping and curing cycle.

With the construction of the present invention, it will be seen that the tire is maintained in a centered position as it is lifted over the projecting center mechanism and moved rearwardly to be deposited on the take-away conveyor. The tire is thus unloaded without any significant dropping of the tire and, more importantly, when unloaded in the manner shown, an elevator cannot pinch the bottom bead of the tire against the top clamping ring assembly of the center mechanism.

THE EMBODIMENT OF FIGS. 17 AND 18

Although the preferred embodiment of the present invention, for simplicity of design, is a slideback press as seen in FIG. 16, it will be appreciated that the chuck and unloading aspects of the present invention can be used in a tilt-back press.

Figures 17, 18, 19:
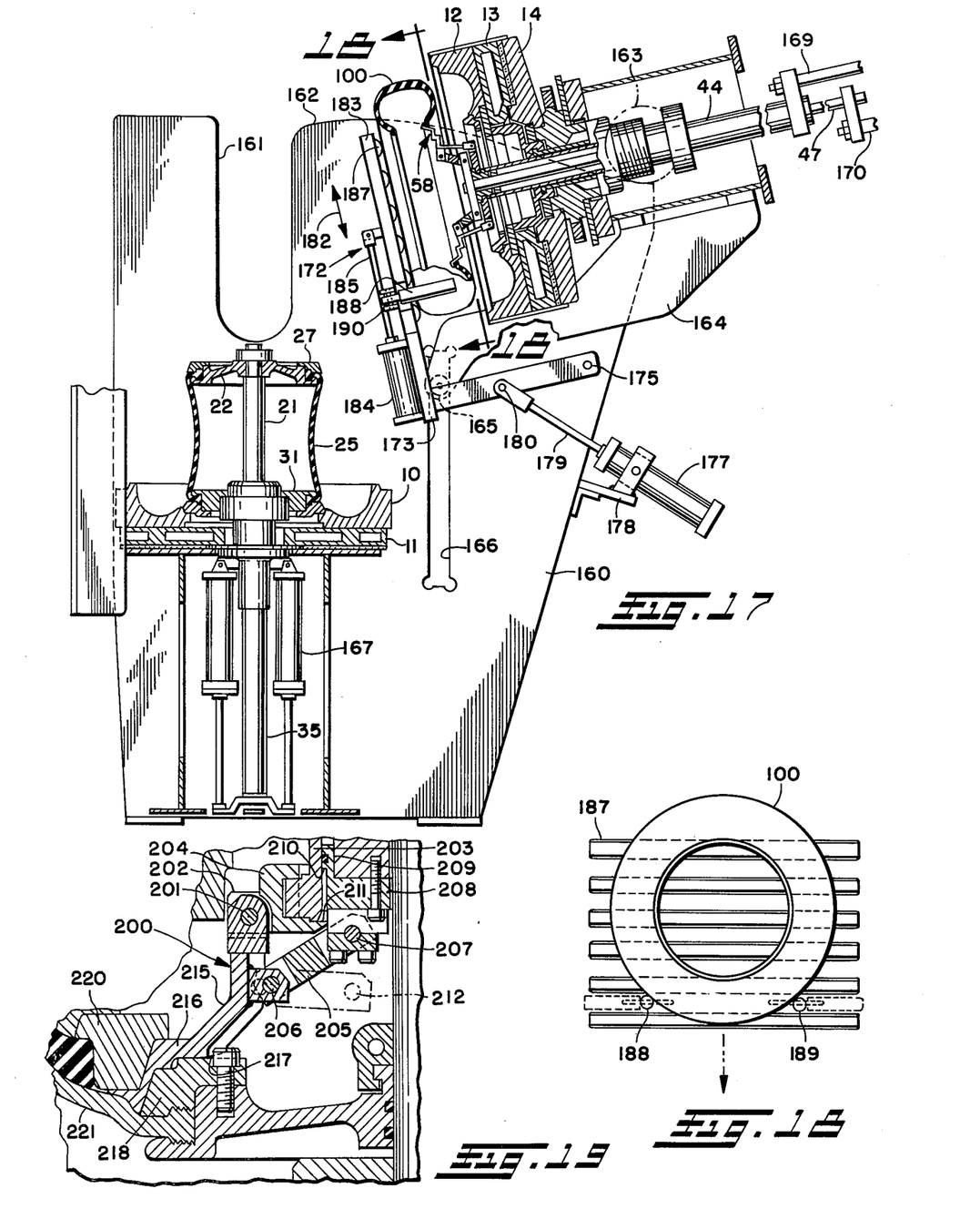
FIG. 17 is a fragmentary vertical section of the present invention employed in a tilt-back press with the cured tire about to be release by the chuck and in engagement with a tire receiver.
FIG. 18 is a plan view of the receiver taken substantially on the line 18—18 of FIG. 17.
FIG. 19 is a fragmentary vertical section of another embodiment of the chuck which when open is mechanically locked.

As seen in FIG. 17, a tiltback press includes the side plates 160 which include a vertical slot 161 and a top cam surface 162. The press head is mounted on trunnion rollers 163 which ride along the top 162 of the side plates and move vertically within the slots 161. Secured to the press head by brackets 164 are rollers 165 which are confined in vertical slots 166. The rollers 163 are moved by links connected to bull gears at the side of the press in conventional manner. The opening of the press is initially vertical as the rollers 163 move up the slots 161, but as the rollers move back along the top edge 162 of the side plates, the confinement of the rollers 165 in the slots 166 causes the press head and top mold section to tilt as shown. The center mechanism 20, the top and bottom mold sections 10 and 12, may be essentially the same as in the slideback embodiment previously described.

FIG. 17 does, however, show a few additional details of the operating mechanisms of the press. For example, the cylinders 167 are employed to elevate the bottom clamping ring assembly of the center mechanism to achieve, for example, the position seen in FIG. 12. Also shown is the bracket 168 for the loader mechanism. Rods 169 and 170 are a schematic depiction of the rods of the piston-cylinder assemblies operating the cylinder 44 and the rod 47, respectively, of the chuck mechanism. Such piston-cylinder assemblies may be supported by brackets, not shown, from the press head.

In the tilt-back press, the operation of the invention may be the same as depicted in FIGS. 8 through 15. However, as the press head moves rearwardly, it inclines to the position shown in FIG. 17 rather than maintaining its parallelism with the bottom mold section as seen in FIG. 16. In such inclined position, in order to remove the tire from the press an unloading mechanism as seen at 172 is provided. Such an unloading mechanism includes a main frame 173 which is supported by arms 174 pivoted at 175 to the press side plates 160. The main frame may be pivoted to and from the tire receiving position shown by piston-cylinder assembly 177, trunnion mounted on brackets 178, the rod 179 of which is connected at 180 to the arm 174.

Mounted for extension and retraction in the direction of the arrows 182 is a conveyor assembly 183. It will be appreciated that there will be two such assemblies mounted on the main frame for a dual cavity press. Extension and retraction of the conveyor assembly is obtained by the piston-cylinder assembly 184, the cylinder being mounted on the main frame while the rod 185 is connected to the conveyor assembly.

Each conveyor assembly includes a plurality of coplanar tire support rolls 187 and also includes a pair of support rollers seen at 188 and 189 which may be pivoted in opposite directions from a position normal to the plane of the rolls 187 to a position parallel to and co-planar with such rolls. The pivoting of the rollers 188 and 189 may be obtained by piston-cylinder assemblies 190. In their pivoted or retracted position, the rolls form a continuation of the support formed by the rolls 187. Such rolls may be also adjusted uniformly toward and away from each other to control the distance therebetween when projecting as indicated in FIG. 17.

The operation of the invention in the tilt-back press embodiment may be exactly the same as described in connection with FIGS. 1 through 3 or 8 through 15. However, when the press moves to its fully opened position with the tire inclined as shown, the piston-cylinder assembly 171 will be extended to pivot the unloader to a position such that the conveyors 183 are parallel to the plane of the tire. The chuck is now partially extended while gripping the tire from the top mold section as seen in comparing FIGS. 15 and 17. The piston-cylinder assembly 184 is now extended to support the tire by means of the rollers 187 and also to support the peripheral or tread portion of the tire by means of the two spaced rollers 188 and 189. When the tire is thus supported by the unloading conveyor, the chuck segments are collapsed and retracted into the top mold section. The rollers 188 peripherally support the tire so that the tire upper bead will not become caught on the shelf of the chuck segments when the chuck is collapsed. When the chuck is clear of the tire, the piston-cylinder assembly 184 may be retracted, and the piston-cylinder assembly 171 is now retracted to move the conveyors 183 to an inclined position clear of the mold sections. The rollers 188 and 189 are now retracted to a horizontal position and the tire rolls clear of the press to the post cure inflator.

In the tilt-back embodiment, a slight pressure on the I.D. of the bead is required to keep the tire from swinging about its top contact point with the chuck. In any event, as in connection with a slideblack press, the tire is removed from the press without any tugging or dropping which may cause the tire to go astray.

With the slideback press, there is, of course, a more simplified unloading mechanism and procedure. Also, the slideback press would normally use a loading mechanism mounted on the press head for horizontal translation therewith. Thus, with a slideback press, the simpler and less complicated loading and unloading mechanisms can be used with the shaping bladder of the type shown. Moreover, with the present invention, there is no requirement for heavy stripping cylinders in the press head. All the pneumatic cylinders operating the chuck need do is hold the same down and out.

THE EMBODIMENT OF FIG. 19

Referring now to the embodiment of the invention disclosed in FIG. 19, in the unlikely event of failure of air pressure, the design of the chuck shown in FIG. 19 will maintain the chuck in its open position regardless of external forces thereon. When the chuck is open, the linkage operating the chuck segments is either on center or slightly over center so that the chuck will neither collapse nor expand as the result of external forces applied thereto. As seen in FIG. 19, the chuck segments 200 are pivoted at their upper ends at 201 to a spider 202 secured to vertically movable cylinder 203 by breech lock 204.

Links 205 are pivoted at 206 to the chuck segments and at 207 to actuator 208. The actuator is secured to cylinder 209 sliding in cylinder 203. The actuator moves through an interior orifice in the spider 202 and the actuator cylinder combination is provided with a shoulder 210 which engages shoulder 211 on the spider 202 when the chuck is fully opened. In such fully opened position, the pivot 207 moves to the position shown at 212 in phantom lines. In such fully opened position, the pivot 212 is in a slightly over center or toggle locked position so that the chuck will remain in such open position regardless of external pressures thereon. The chuck can then be collapsed only by the application of pressure to the cylinder 209.

In FIG. 19, there is illustrated a chuck segment which is particularly useful for relatively large truck tires. Accordingly, each chuck segment includes a flaring portion in its stem as indicated at 215. The horizontal portion 216 at the lower end of the flaring portion is provided with the radiused undersurface indicated at 217 to permit the segments to rock or pivot on top of the upper bladder clamping plate 218.

The lower end of the chuck segments may be identical in structure to the chuck segments shown in FIG. 19, for example, and nests between the bladder clamping plate 218 and the bead ring 220 forming a smooth continuation between the two adjacent the bladder 221 during cure.

In any event, the pivot arrangement is such that the chuck is locked when fully opened and cannot be collapsed by external pressures thereon, whether vertical or radial.

With the present invention, it will be seen that a simplified tire press is provided and one which will minimize tire defects such as bead "kinking", not only by holding the tire as the bladder is stripped therefrom, but also by maintaining the tire centered as it is elevated over the center mechanism and moved to the rear of the press. While accomplishing these desirable results, the chuck not only cooperates with the top clamping assembly of the bladder mechanism, but also with the interior pilot surface of the top bead ring thus centering the shaping mechanism with respect to both mold halves. The chuck segments also act as a bladder engaging ring when the chuck expands assisting and stripping of the bladder from the upper bead of the tire without stretching or distortion of the bladder.

I, therefore, particularly point out and distinctly claim as my invention:

1. A tire curing press of the type wherein a top movable mold section moves vertically away from and horizontally with respect to a stationary bottom mold section, an upstanding bladder center mechanism in said stationary mold section which includes a movable top plate, and an expandable and collapsible chuck means in said movable mold section cooperating with said top plate and operative when expanded to secure the cured tire shortly after the press begins to open, first to hold the tire while the tire is stripped from the mold sections and the bladder is stripped from the tire, and then to remove the cured tire from the press with the movable mold section.

2. A press as set forth in claim 1 wherein said chuck means is movable axially of said top mold section, and means responsive to the movement of said top plate also to move said chuck means.

3. A press as set forth in claim 1 including means to move said chuck means independently of said movable top plate whereby the cured tire may be lifted to clear the center mechanism before the top mold section moves horizontally.

4. A press as set forth in claim 1 including a discharge conveyor, and means to extend said chuck means axially from said top mold section when the press is fully opened to place the cured tire on said discharge conveyor for removal from the press when the chuck means collapses and retracts.

5. A press as set forth in claim 4 including means to incline said discharge conveyor when the cured tire is thus placed thereon.

6. A press as set forth in claim 1 wherein said chuck means includes a skirt portion maintaining the cured tire centered with respect to said center mechanism and throughout its removal from the press.

7. A press as set forth in claim 6 including a conical pilot surface on said top plate, the inner surface of said skirt portion conforming to said pilot surface when said chuck means is collapsed and said press is closed.

8. A press as set forth in claim 7 including a bead ring secured to said top mold section, and a conical pilot surface on said bead ring, the outer surface of said skirt portion conforming to said pilot surface when said chuck means is collapsed and retracted into said top mold section.

9. A press as set forth in claim 6 including a bead ring secured to said top mold section, and a conical pilot surface on said bead ring, the outer surface of said skirt portion conforming to said bead ring when said chuck means is collapsed and retracted into said top mold section.

10. A tire curing press as set forth in claim 1 including a post supporting said top plate, which plate includes a conical pilot surface, said chuck means being adapted to telescope over said plate and including an interior pilot surface adapted to mate with the pilot surface of said plate when the chuck means is collapsed.

11. A press as set forth in claim 1 wherein said plate includes a planar horizontal circular top surface, said chuck means including segments each having a radiused surface mating with said top surface, whereby as said chuck means expands, the two mating surfaces will maintain at least chordal line contact.

12. A tire curing press as set forth in claim 1 wherein the upstanding bladder center mechanism projects axially upwardly from the bottom mold section and the chuck means is mounted axially in the top mold section.

13. A tire curing press as set forth in claim 12 including a bead ring secured to the top mold section and having a conical pilot surface, said chuck means being adapted to telescope within said bead ring and including an exterior pilot surface adapted to mate with the pilot surface of said bead ring when the chuck means is collapsed.

14. A press as set forth in claim 13 wherein said plate includes a planar horizontal circular top surface, said chuck means including segments each having a radiused surface mating with said top surface, whereby as said chuck means expands, the two mating surfaces will maintain at least chordal line contact.

15. A press as set forth in claim 14 including an interior flange on said bead ring having a horizontal lower surface, and a horizontal stop surface on each segment adapted to engage said interior flange when said chuck means is collapsed and telescoped within said bead ring.

16. A press as set forth in claim 15 wherein each chuck segment includes a conical skirt portion, the opposite sides of which form said interior and exterior pilot surfaces thereof.

17. A press as set forth in claim 16 wherein each skirt portion includes a lower end having a foot with a heel and a toe, said foot being adapted to bear against the bladder as said chuck means expands while held vertically against said top plate.

18. A press as set forth in claim 17 wherein said toe is formed by a substantially horizontal shelf projecting from the skirt portion.

19. A press as set forth in claim 17 wherein said heel is at the same elevation as said bladder when contact is maintained between said chuck means and top plate.

20. A tire curing press as set forth in claim 1 wherein said press is of the slideback type wherein the top mold section moves vertically away from and then horizontally all in parallelism with respect to the stationary bottom mold section.

21. A press as set forth in claim 55 wherein said bladder is open-ended, said center mechanism projecting from said bottom mold section and including a clamping assembly for the upper open end of said bladder, a part of which is said top plate, said top plate having a conical pilot surface on the exterior thereof, said chuck means including an interior pilot surface adapted to mate therewith when said chuck means is collapsed.

22. A tire press as set forth in claim 1 wherein said chuck means includes a plurality of segments, each segment including at its upper end a vertically extending portion, the upper end of which is pivoted to a spider movable axially of said top mold section.

23. A tire press as set forth in claim 22 including link means connected to the lower end of each vertically extending portion, each link means being connected to a chuck means operator, and means to move said operator with respect to said spider to cause said segments to pivot.

24. A tire press as set forth in claim 23 including stop means to limit movement of said operator with respect to said spider to control the extent of expansion of said chuck means.

25. A tire press as set forth in claim 24 wherein said top plate is mounted on a projecting post, both said operator and said spider being supported on telescoping tubes, the I.D. of the interior tube being sufficient to clear the O.D. of the post.

26. A tire press as set forth in claim 23 wherein the pivots of said link means achieve an over-center position when said chuck means is fully opened to lock the chuck means against movement when opened.

27. A tire press as set forth in claim 1 wherein said chuck means includes a conical tire centering portion projecting generally axially through the cured tire bead when the chuck means is expanded.

28. A tire press as set forth in claim 27 including adjustable stop means to limit expansion of said centering portion.

29. A tire press as set forth in claim 27 including a foot portion on said chuck means which includes a toe and a heel on the lower end of the centering portion, the toe projecting beneath the top tire bead and the heel engaging the bladder to press the same away from the top tire bead when the chuck means initially expands.

30. A tire press as set forth in claim 1 including first pressure means operative to open the chuck means to a set position when sufficient clearance has been established between said movable top mold section and said top plate.

31. A tire press as set forth in claim 30 including second pressure means operative to maintain the chuck means while open against said top plate as the latter moves upwardly to strip the bladder from the tire.

32. A tire curing press as set forth in claim 1 wherein said chuck means includes an annular foot adapted to telescope over said top plate and bear against the bladder as said chuck means radially expands to engage the top bead of a cured tire while held vertically against said plate.

33. A tire press as set forth in claim 32 wherein said chuck means includes a tire centering portion extending substantially vertically from said foot operative to center the tire with respect to said plate when the chuck means is expanded.

34. A tire press as set forth in claim 33 wherein the elevation of the bladder at the top plate is lower than the bead of the tire when the press is closed, said foot including a smooth fillet undersurface for the bladder from the top plate to the tire bead.

35. A tire curing press as set forth in claim 1 wherein said press is of the tilt-back type wherein the top movable mold section moves vertically away from and then tilts rearwardly with respect to the stationary bottom mold section as it moves horizontally.

36. A tire press as set forth in claim 35 wherein said chuck means includes means to grip the tire by the upper bead and retract the same into the movable mold section to clear the center mechanism after the bladder has been stripped therefrom.

37. A tire press as set forth in claim 36 including a tire receiver operative to support the tire when the press is fully open and the movable mold section is tilted, and while the chuck means still grips the tire.

38. A tire press as set forth in claim 37 wherein said tire receiver includes means to support the lower peripheral portion of the tire.

39. A tire press as set forth in claim 38 wherein said last mentioned means includes laterally adjustable pivotally mounted stop rolls.

40. A tire press as set forth in claim 39 wherein said receiver includes a pivotally mounted roller platform, said stop rolls, when retracted, forming a surface continuation of said platform.

* * * * *

UNITED STATES PATENT AND TRADEMARK OFFICE
CERTIFICATE OF CORRECTION

PATENT NO. : 4,068,989
DATED : January 17, 1978
INVENTOR(S) : Armindo Cantarutti It is certified that error appears in the above—identified patent and that said Letters Patent is hereby corrected as shown below:

In claim 21, line 1, change "55" to --1--.

Signed and Sealed this

Third Day of February 1981

[SEAL]

Attest:

RENE D. TEGTMEYER

Attesting Officer     Acting Commissioner of Patents and Trademarks